Dec. 29, 1942. H. W. LORD 2,306,784
ELECTRIC CONTROL CIRCUIT
Filed Dec. 17, 1940
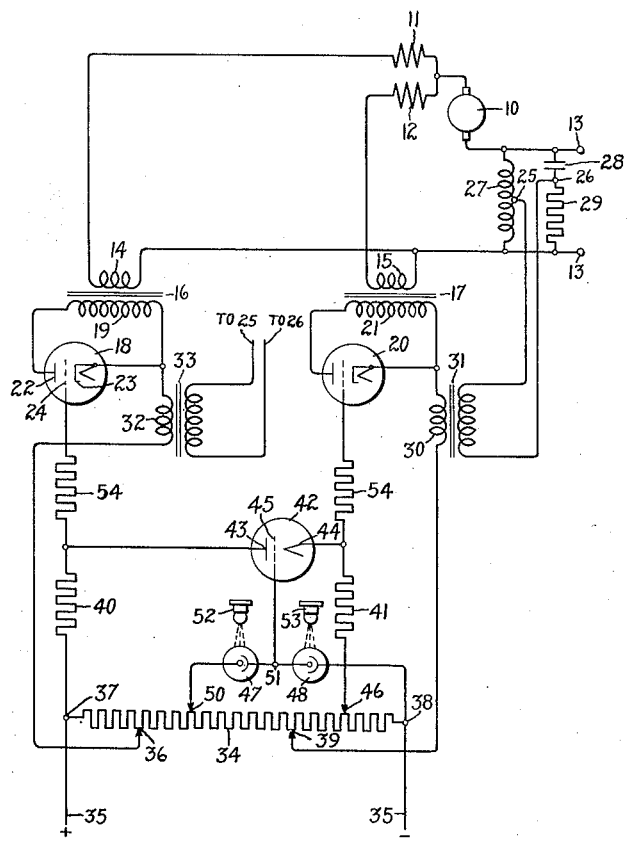
Inventor:
Harold W. Lord.
by Harry E. Dunham
His Attorney Patented Dec. 29, 1942

2,306,784

UNITED STATES PATENT OFFICE 2,306,784

ELECTRIC CONTROL CIRCUIT

Harold W. Lord, Schenectady, N. Y., assignor to General Electric Company, a corporation of New York Application December 17, 1940, Serial No. 370,495

9 Claims. (Cl. 250—27)

My invention relates to electric control circuits and more particularly to control circuits employing electric valve means.

In industrial operations, it is frequently desirable to control the operation of electrical devices, such as an electric motor, in response to the current conducted by light-sensitive electric valves. For example, in arrangements where it is desired to maintain sheet material in a predetermined relation or position with respect to rollers or conveyors, light-sensitive electric valves have been employed in connection with electric discharge valves and a positioning means such as an electric motor. Owing to the limited current which can be conducted by the ordinary commercial type of light-sensitive electric valve, it is important to employ means for amplifying the output of the light-sensitive valves in order to obtain sufficient power to accomplish the desired controlling action. Such arrangements have been provided but have for the most part been rather complicated and required an inordinate amount of equipment for the type of control accomplished. In accordance with my invention, I provide an improved electric control circuit particularly adapted for controlling a reversible electric motor in accordance with variations in the amount of light falling upon each one of a pair of serially connected photo-electric valves which is characterized by its simplicity and low cost while providing very satisfactory control.

It is an object of my invention to provide a new and improved electric control circuit.

It is another object of my invention to provide a new and improved electric valve control circuit.

It is a further object of my invention to provide a new and improved control circuit for use in connection with light-sensitive electric valves and particularly to circuits of this character adapted for controlling a reversible electric motor.

In accordance with the illustrated embodiment of my invention I provide a new and improved electric control system in which the direction and speed of operation of a reversible alternating current motor having a split field is controlled by controlling the magnitude of an impedance element connected in series with each section of the field winding. Each impedance element comprises one winding of a transformer, the other winding of which is shunted by an electric valve controlled in accordance with variations in light falling on a pair of serially connected light-sensitive electric valves. The common juncture of the light-sensitive valves establishes the potential of the control electrode of an amplifier valve, the anode-cathode circuit of which is utilized to derive a biasing potential for each of the electric valves shunting the transformer windings. The biasing potentials are obtained by means of several resistors each connected in the control electric circuit of one of the valves controlling the impedance in circuit with one of the field winding sections. The resistors are so arranged with respect to the anode-cathode circuit of the amplifier valve and the cathode-control circuits of the impedance controlling valves that the biasing potentials for the two impedance controlling valves are of opposite polarity and thus an increase in magnitude of the current conducted by the amplifier valve increases the conductivity of one of the impedance controlling valves while it decreases the conductivity of the other of the impedance controlling valves. With this arrangement a single amplifier valve is used in conjunction with serially connected light cells to control the operation of the main discharge valves of the electric control system.

My invention, both as to its organization and operation, will be better understood by reference to the following description taken in connection with the accompanying drawing and its scope will be pointed out in the appended claims. In the drawing the single figure is a schematic representation of one embodiment of my invention.

Referring now to the drawing, I have chosen to represent my invention as applied to an electric control circuit for controlling the operation of a reversible motor 10 having series field winding sections 11 and 12. The motor 10, as illustrated, is of the alternating current type and is connected to be energized from an alternating current supply circuit 13. The field winding sections 11 and 12 are connected together and the common terminal thereof is connected with one of the armature terminals of the motor 10. The other terminals of the windings 11 and 12 are connected to one side of the alternating current supply circuit through inductive windings 14 and 15, respectively, which form the primary windings of transformers 16 and 17. In accordance with my invention I provide an improved arrangement for controlling the impedance of windings 14 and 15 and in this manner control the relative strengths of the fields produced by windings 11 and 12 and the magnitude of the armature current and in this way control the direction and speed of rotation of the motor 10.

The impedance of winding 14 is controlled by an electric valve 18 connected in shunt relation with the winding 19 which forms the secondary winding of transformer 16. Similarly, electric valve 20 is connected in shunt with the winding 21 which forms the secondary winding of transformer 17. By controlling the conductivities of electric valves 18 and 20 the impedance of windings 14 and 15 may be effectively controlled. In the particular form illustrated the valves 18 and 20 are of the type utilizing an ionizable medium such as a gas or vapor and each comprises an anode 22, a cathode 23 and a control member or grid 24. The control circuit for controlling the conductivities of electric valves 18 and 20 in accordance with variations in the light falling on a pair of series connected light-sensitive valves will now be described.

In the arrangement illustrated, the control potential for the control electrode of each of the valves 18 and 20 is made up of an alternating current component, a bias potential and a variable bias potential dependent upon the distribution of light on two serially connected photoelectric valves. The alternating current component is derived from the alternating current circuit 13 from the output terminals 25 and 26 of a static phase shifting circuit including a voltage dividing reactor 27 and a serially connected capacitor 28, and resistor 29. The voltage appearing across the terminals 25 and 26 is impressed on the circuit of the control electrode of electric valve 20 by means of the secondary winding 30 of a transformer 31. Similarly, the voltage derived from the output terminals 25 and 26 is impressed on the circuit of control electrode 24 of valve 18 by means of the secondary winding 32 of a transformer 33. The direct current bias potential of constant magnitude for each of the electric valves 18 and 20 is obtained from a portion of a voltage dividing resistor 34 which is energized from a suitable direct current supply circuit 35. The portion of resistor 34 connected in the cathode to control electrode circuit of electric valve 18 is included between terminals 36 and 37 while the portion of the voltage dividing resistor 34 which is connected in circuit with the cathode to control member circuit of electric valve 20 is included between the terminals 46 and 39. The variable direct current biasing potential for electric valves 18 and 20 are obtained from the resistors 40 and 41 which are connected in circuit with an electric valve 42 preferably of the high vacuum type which includes an anode 43, a cathode 44 and a control member or grid 45. The anode-cathode voltage of the electric valve 42 is derived from a portion of voltage dividing resistor included between the terminal 37 and a terminal 46 which is intermediate the terminals 38 and 39. Light-sensitive electric valves 47 and 48 are connected in series and across a portion of the voltage dividing resistor 34 included between terminal 38 and a terminal 50 which is intermediate the terminals 38 and 39. The common terminal 51 of the light-sensitive electric valves is connected to the control electrode of the amplifier valve 42. The state of conductivity of the light-sensitive electric valves 47 and 48 is controlled by light sources 52 and 53 in accordance with some condition which it is desired to control, such as for instance the position of sheet material on a conveyor.

From the preceding description it is seen that the cathode-to-control member circuit of electric valve 18 includes the secondary winding 32 of transformer 33, the portion of the voltage dividing resistor 34 included between terminals 36 and 37, and the biasing resistor 40, while the cathode-to-control member circuit of electric valve 20 includes the secondary winding 30 of the transformer 31, the portion of the voltage dividing resistor 34 included between terminals 39 and 46, and the biasing resistor 41. Suitable current limiting resistors 54 may also be provided in circuit with the control member 24 of valves 18 and 20.

The operation of the embodiment of my invention illustrated in the drawing will be explained by considering the operation of the system for controlling the speed and direction of rotation of the motor 10 in accordance with the resistance of the light-sensitive valves 47 and 48. In other words, if the light-sensitive valves 47 and 48 and light sources 52 and 53 are used in a spacing or positioning operation, it may be considered that the system is operating to maintain by means of the direction and speed of rotation of the motor 10 a predetermined distribution of light upon the light-sensitive valves 47 and 48. The control circuit for electric valves 18 and 20 are adjusted so that with the predetermined distribution of light on the light-sensitive valves 47 and 48 the valves 18 and 20 are equally conductive and carrying for example, approximately one-third rated current. Under these circumstances, the impedance of both of the elements 14 and 15 are substantially the same and the field windings 11 and 12 are excited to the same extent. Under these conditions the motor 10 is at standstill. It will be noted that the connections of the circuits of control electrodes 24 of valves 18 to 20 are such that the bias potential for valve 18 obtained from a portion of the voltage dividing resistor 34 is a positive biasing potential and the potential obtained from the resistor 40, which varies in accordance with the current conducted by the electric valve 42, is a negative biasing potential. In case of the circuit energizing the control electrode 24 of electric valve 20 the biasing potentials have a reverse polarity with respect to that just described in connection with valve 18. That is, the biasing potential obtained from the voltage dividing resistor 34 is a negative biasing potential, and the variable bias obtained from resistor 41 in the anode-cathode circuit of amplifier valve 42 is a positive biasing potential. With this arrangement, it is apparent that increased current through the amplifier valve 42 resulting from a variation in the conductivity of one of the light-sensitive electric valves 47 and 48 will increase the magnitude of the bias included in the circuit of control member 24 of both valves 18 and 20. However, since this variable bias in the case of resistor 40 associated with the control member of electric valve 18 is negative and is positive in the case of resistor 41 associated with the control member 24 of electric valve 20, it is apparent that the conductivity of the electric valve 18 will be decreased while the conductivity of the electric valve 20 is increased. Under this condition the impedance of element 15 is increased and is greater than the impedance of element 14 and the field winding 11 predominates so the motor is energized to rotate in one direction at a speed dependent upon the amount of difference in the current conducted by the electric circuits including the windings 11 and 12. If, as discussed earlier in the specification, the motor 12 is used to control the position of sheet material which determines the light distribution on the light-sensitive valves, the operation of the motor will be effective to restore the predetermined position of the material which will bring the conductivity of valves 18 and 20 back to equality and render the motor stationary. The operation of the light-sensitive electric valves controlling the control member of the amplifier valve 42 will be readily understood by those skilled in the art. As is well known, the resistance of the light-sensitive valves 47 and 48 decreases as the light falling thereon increases. Thus, if due to a change in the position of the material or other condition controlled by the apparatus, the light falling on valve 47 increases with respect to the amount of light falling on light-sensitive valve 48 the potential of the terminal 51 to which control member of valve 42 is connected will become more positive and the current through biasing resistors 40 and 41 will increase. Conversely, if the light on light-sensitive electric valve 48 increases with respect to the light falling on light-sensitive valve 47, the potential of point 51 becomes more negative with respect to the cathode 44 of valve 42 and the current flowing through biasing resistors 40 and 41 decreases with a resultant opposite effect on the relative conductivities of valves 18 and 20 and a reversal in the direction of rotation of the motor 10.

From the foregoing description, it is seen that by means of a single electric valve the electric valves 18 and 20 and ultimately the motor 10 are controlled in accordance with the variations in the light falling on the serially connected light-sensitive valves 47 and 48. It is also possible to utilize many features of applicant's invention in connection with circuits in which light-sensitive devices are not utilized, inasmuch as variable resistors which vary in accordance with some change in a mechanical condition, such as pressure or movement of a circuit controlling member, could be used to vary the potential of the control member 45 of the valve 42 in accordance with the condition to be controlled.

While I have shown and described a particular embodiment of my invention, it will be obvious to those skilled in the art that changes and modifications may be made without departing from my invention, and I, therefore, aim in the appended claims to cover all such changes and modifications as fall within the spirit and scope of my invention.

What I claim as new and desire to secure by Letters Patent of the United States is:

1. In combination, a pair of main electric valves each including a control electrode, a control circuit for each of said valves including means for impressing an alternating voltage component and a direct current voltage component on each of said control electrodes, the direct current voltage component impressed on the control electrode of each of said valves being of opposite polarity, an auxiliary electric valve including a control member, a source of direct current for energizing the anode-cathode circuit of said auxiliary electric valve, and means including a pair of serially connected light-sensitive electric valves and an electrical connection between the control member of said auxiliary valve and a point in the series connection between said light sensitive electric valves for controlling the energization of the control member of said auxiliary valve to vary the magnitude of the direct current voltage component impressed on each of said control circuits so that the conductivities of said main electric valves are varied in opposite directions in repsonse to a variation in the distribution of light on said light-sensitive electric valves.

2. In combination, a pair of main electric valves, a control circuit for controlling the conductivity of each of said valves and each including a source of periodic voltage and an impedance element for introducing therein a direct current voltage component, an auxiliary electric valve including an anode, a cathode and a control electrode, a direct current source, means connecting the anode-cathode circuit of said auxiliary valve, said direct current source and the impedance element of each of said control circuits in series in a closed circuit with said auxiliary electric valve between said impedance elements, and means for energizing the control electrode of said auxiliary electric valve in accordance with variations in a condition to be controlled to vary the magnitude of the direct current voltage components introduced into said control circuits to vary the conductivities of said main electric valves in accordance with variations in said condition.

3. In combination, a plurality of main electric valves each having a control electrode associated therewith, a control circuit for controlling the energization of the control member associated with each of said main electric valves, each of said control circuits including a source of alternating current voltage, a source of direct current voltage of constant magnitude and an impedance element, means for producing across the impedance element of each of said control circuits a direct current voltage of variable magnitude comprising an auxiliary valve having an anode, a cathode and a control electrode, said impedance elements being connected in series circuit relation with the anode-cathode circuit of said auxiliary valve, means for varying the voltage impressed on the control electrode of said auxiliary valve to simultaneously vary the magnitude of the variable direct current voltage produced across said impedance elements, said direct current voltages of variable magnitude being of opposite polarity so that variations in the conductivity of said auxiliary electric valve is effective to vary the conductivities of said main electric valves in opposite directions.

4. In combination, a plurality of main electric valves each having a control electrode associated therewith, a control circuit for controlling the energization of the control electrode associated with each of said main electric valves, each of said control circuits including a source of alternating current voltage, a source of direct current voltage of constant magnitude and an impedance element, the source of direct current voltage of constant magnitude of one control circuit being of opposed polarity with respect to the constant direct current voltage of the other of said circuits, means for producing direct current voltages of variable magnitude across the impedance element of each of said circuits having a polarity opposed to the direct current voltage of constant magnitude of that circuit comprising an auxiliary electric valve having an anode, a cathode and a control electrode, a direct current circuit, means connecting said impedance elements and the anode-cathode circuit of said auxiliary valve in circuit with said direct current circuit, variable resistance means energized from said direct current circuit and including an intermediate terminal to which the control electrode of said auxiliary valve is connected and a pair of end terminals, and means for varying the resistance included between said intermediate terminal and the end terminals of said resistance means in response to a condition to be controlled to vary the conductivity of said auxiliary electric valve and thereby to vary the magnitude of the direct current voltage produced across said impedance elements.

5. In combination a plurality of main electric valves each having a control electrode associated therewith, a source of direct current voltage, a voltage dividing resistor connected across said source of direct current voltage, an auxiliary electric valve including an anode, a cathode, and a control electrode having the anode-cathode circuit thereof energized from said voltage dividing resistor through a circuit including a plurality of impedance elements, a control circuit for controlling the energization of the control electrode associated with each of said main electric valves including a source of alternating voltage, one of the impedance elements connected in the anode-cathode circuit of said auxiliary valve and a portion of said voltage dividing resistor, said elements being so connected that the voltage of the impedance element connected in circuit with the control electrode associated with one of said main valves is of one polarity and the voltage across the impedance element connected in circuit with the control electrode associated with the other of said valves is of the opposite polarity so that variations in the magnitude of the voltage drop across said impedance elements in the same direction are effective to vary the conductivities of said main electric valves in opposite directions, and means for varying the energization of the control electrode of said auxiliary electric valve to control said main electric valves.

6. In combination a pair of electric valves each having a control electrode associated therewith for controlling the conductivity thereof, a control circuit for controlling the energization of said control electrodes including a source of direct current voltage, a voltage divider connected across said source, a pair of serially connected light-sensitive electric valves energized from said voltage divider and having a common terminal, an auxiliary electric valve energized from a portion of said voltage divider and including a control electrode energized in accordance with the voltage of the common terminal of said light-sensitive electric valves, the anode-cathode circuit of said auxiliary electric valve including a pair of biasing resistors, an excitation circuit for each of said main electric valves including one of said biasing resistors, said biasing resistors being connected to impress on the control members of said main electric valves direct current voltages of opposite polarity and varying magnitude to vary the conductivities of said main electric valves in opposite directions in response to changes in the distribution of light on said light-sensitive electric valves.

7. In combination, a pair of electric circuits, a pair of electric valves for controlling the energization of said circuits and each having a control electrode associated therewith, a source of direct current voltage, a control circuit for energizing the control electrode associated with each of said electric valves including a source of alternating voltage and means for deriving a direct current voltage component from said source of direct current voltage, means for varying simultaneously the magnitude of the direct current voltage component of each of said control circuits including an auxiliary electric valve having the anode-cathode circuit thereof energized from said first mentioned direct current source and including said means for deriving the direct current voltage components, and means responsive to a condition of said first mentioned circuits for controlling the energization of the control electrode of said auxiliary electric valve to vary the magnitude of the direct current voltage components of both said control circuits, said direct current voltage components being of opposite polarities so that variations in the magnitude thereof in the same direction causes the conductivities of said main electric valves to be varied in opposite directions.

8. In combination, a pair of electric circuits, an impedance element connected in series with each of said circuits, an electric valve effectively connected in shunt with each of said impedance elements and each including a control electrode for controlling the conductivity thereof, a control circuit including an auxiliary electric valve having a control electrode, a pair of serially connected light-sensitive electric valves having the common terminal thereof associated with the control electrode of said auxiliary valve to control the conductivity thereof in accordance with the distribution of light on the light-sensitive electric valves, means associated with said auxiliary valve for varying simultaneously the conductivities of said electric valves in opposite directions in accordance with the current conducted by said auxiliary valve to control the current flow in said pair of circuits in accordance with the distribution of light on said light-sensitive electric valves.

9. In combination, a pair of electric valve means each having a control member associated therewith for controlling the conductivity thereof, a control circuit for controlling the energization of the control member of each of said valve means and each including a source of voltage and an impedance element, and means for simultaneously varying the conductivities of said electric valve means in opposite directions comprising a second source of voltage and variable impedance means connected in series relation with the impedance elements of said control circuits with said variable impedance means connected between said impedance elements to produce unidirectional current flow of variable magnitude from said second source through the impedance elements in said control circuits, said impedance elements being so connected in said control circuits that the polarities of the voltages across the impedance elements of said control circuits are opposite with respect to the control members with which they are associated.

HAROLD W. LORD.